Patented Oct. 2, 1928.

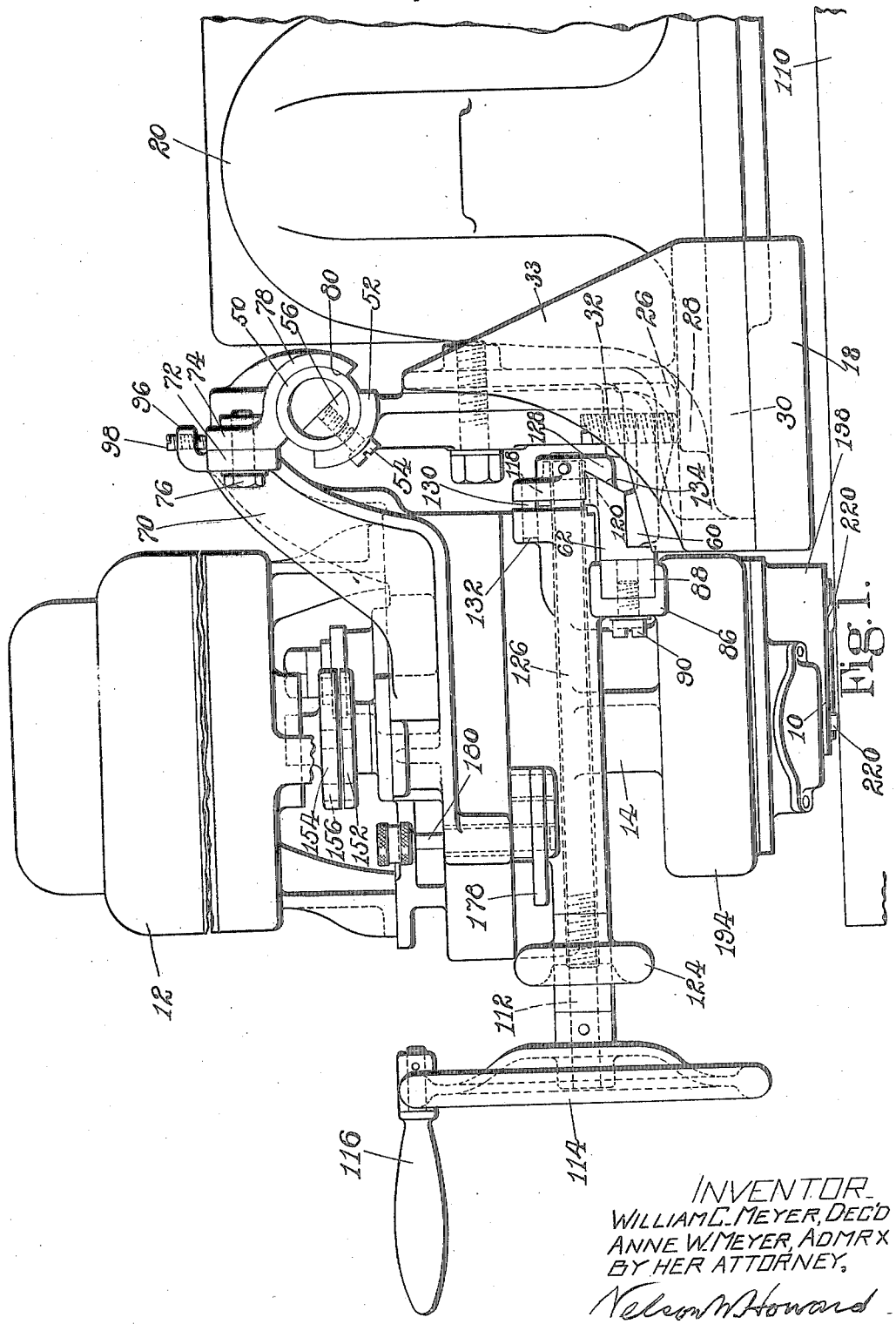

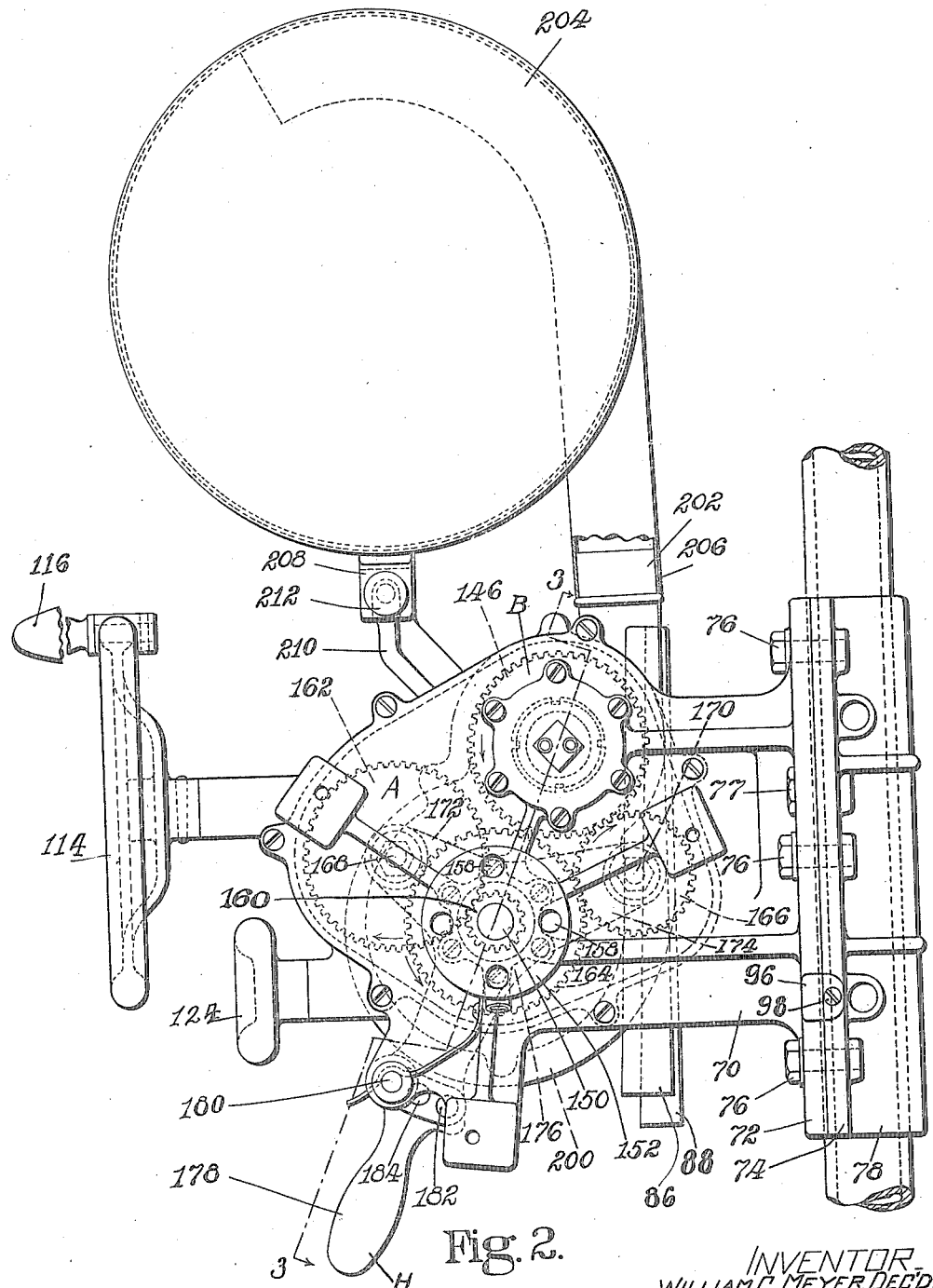

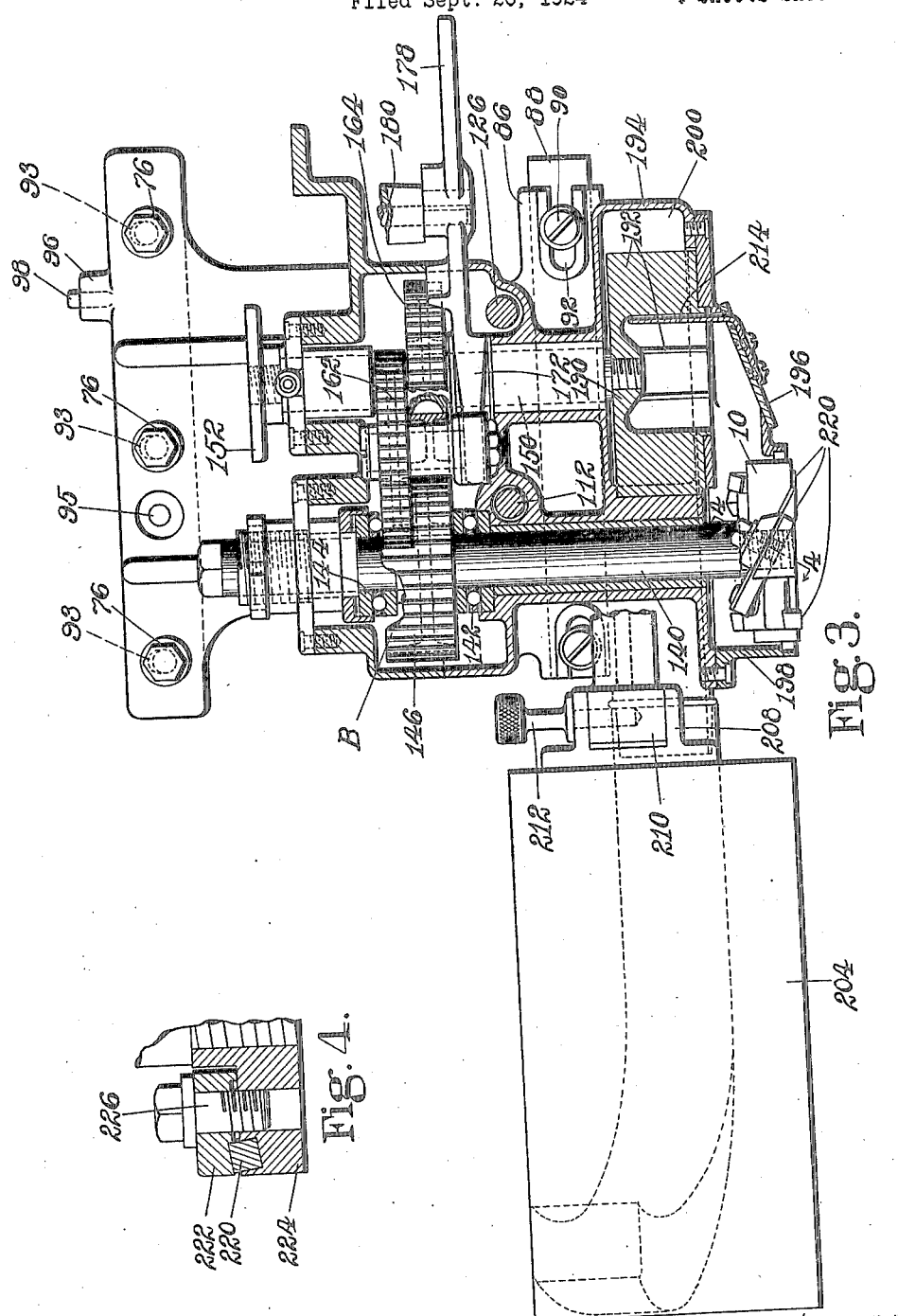

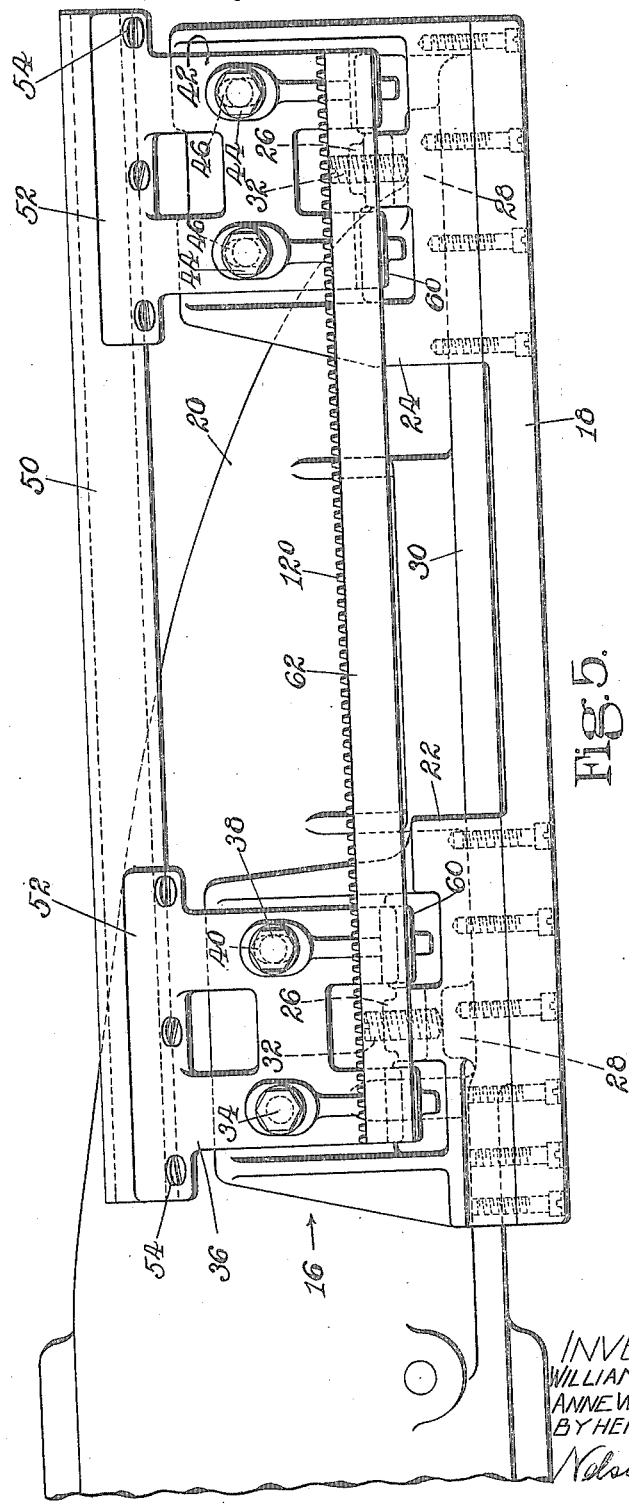

1,685,784

UNITED STATES PATENT OFFICE.

WILLIAM C. MEYER, DECEASED, LATE OF BEVERLY, MASSACHUSETTS, BY ANNE W. MEYER, ADMINISTRATRIX, OF BEVERLY, MASSACHUSETTS, ASSIGNOR TO UNITED SHOE MACHINERY CORPORATION, OF PATERSON, NEW JERSEY, A CORPORATION OF NEW JERSEY.

RESURFACING MACHINE.

Application filed September 26, 1924. Serial No. 740,098.

This invention relates to machines for use in forming smooth surfaces upon articles of wood or like material, and a particular object of the invention is to provide an improved machine of this character adapted for use in planing surfaces such as the working surfaces of the cutting blocks of dieing-out machines, such as the well-known clicking machines which are used extensively for dieing-out uppers in the manufacture of boots and shoes.

In all machines which employ dies for cutting blanks from sheet material supported upon cutting blocks during the cutting operations, resurfacing of the blocks is a frequent necessity since a smooth surface on the cutting block is a prerequisite to clean and economical cutting of the material. In certain prior constructions the arrangement of the parts was such that the efforts of two or three men were required in mounting and assembling the resurfacing apparatus upon the presser member of a clicking machine. It is one of the objects of this invention to provide an improved arrangement of apparatus so that a resurfacing machine and its support may be attached to the presser member of a clicking machine in assembled relation ready for resurfacing operations through the unaided efforts of a single workman. This object has been accomplished by an improved construction and arrangement of the supporting surfaces on a bracket which serves as the support for the resurfacing machine, by which the bracket may be made much lighter in weight without sacrifice of strength. Moreover, one of the supporting surfaces on the bracket is a rod or tube over which an arm on the frame of the resurfacing machine is adapted to hook, thus facilitating assembly of the apparatus.

In recent years there have been introduced, in the shoemaking and other allied industries, fibre blocks for cutting machines of the dieing-out class which although they have had marked success because of their characteristic advantages, have proved to be much more difficult to resurface than the wooden cutting blocks which have been so generally in use with all classes of cutting machines. Accordingly, it is a further object of the invention to provide a resurfacing machine which is readily adaptable to the resurfacing of blocks of various classes and having surfaces offering various degrees of resistance to resurfacing operations including fibre blocks.

To this end and in accordance with the invention there is provided a cutter having its cutting edge arranged at an inclination to the direction of movement of the cutter whereby a shearing cut is produced during the bodily movement of the cutter with relation to the cutting block surface. To adapt this cutter to the cutting of material of various degrees of resistance and with a view to prolonging the life of the cutter, there is provided in the illustrative machine means for varying at will the speed of the cutter. As shown, provision is made between the motor shaft and the cutter shaft for a gearing which comprises a plurality of gears of different sizes together with means for selectively connecting the shafts through a larger or a smaller gear accordingly as it is desired to drive the cutter shaft at a greater or a lesser speed. The regulation of the speed of the cutter shaft is accomplished through the shifting by hand of a spider or supporting plate which carries a plurality of gears which may be connected selectively with the gears connected to both the motor shaft and the cutter shaft, whereby the latter is driven from the former at a predetermined number of revolutions per minute. Preferably, also, there is an intermediate position for the carrying plate or spider in which none of the gears carried thereby serves as a connecting means between the driving shaft and the cutter shaft. By this arrangement the operator may readily leave his machine in inoperative condition so that it may not be operated during his absence inadvertently or by anyone unfamiliar with the construction and mode of operation of the machine and at the same time be easily and quickly restored to operative condition when desired. A further advantage resides in the fact that some other part of the device may be operated while the cutters are at rest, as in the preferred form of the invention, wherein a fan or blower for a dust collector may be operated without operating the cutters.

Other features of the invention relate to the provision of improved means for facilitating the adjustment of the resurfacing machine into the desired operative position as a preliminary to resurfacing operations on each successive portion of the block, and for securing it in any such position. Improved means is also provided by which the resurfacing machine may be adjusted relatively to the block to secure the desired inclination of the cutting surface on the block.

The above and other features of the invention including certain details of construction and combinations of parts will be described in the specification and pointed out in the appended claims.

In the drawings,

Figure 1 is a view in front elevation of a resurfacing machine attached to the presser member of a clicking machine and in position for operation;

Fig. 2 is a plan view from above of the resurfacing machine with the motor removed;

Fig. 3 is a view taken substantially along the line 3—3 of Fig. 2, certain of the parts along the line not being sectioned;

Fig. 4 is a section along the line 4—4 in Fig. 3, looking in the direction of the arrows and showing the clamping devices for a cutter; and Fig. 5 is a view in side elevation of the support for the resurfacing machine in attached position upon the presser member of a clicking machine.

In the illustrated apparatus the resurfacing machine, comprising a cutter head 10 and its driving motor 12 (Fig. 1) together with the supporting frame 14 for these parts, is so constructed that it may be readily placed upon the presser member of a clicking machine or removed therefrom through the efforts of one man. This desirable result has been accomplished in part through the provision of a specially constructed bracket or support 16 for the resurfacing machine which is shown in side elevation in Fig. 5 of the drawings, the construction of the bracket being such that it may be readily placed upon and secured to the presser member of a clicking machine and be just as easily removed therefrom.

In the preferred construction, the support 16 comprises a plate 18 for engagement with the under surface of a presser member 20 of a clicking machine of any well-known type such as that shown, for instance, in Patent No. 921,503, granted May 11, 1909 on application of Arthur Bates. Secured to the upper surface of the plate 18 are two brackets 22, 24 having flange portions 26 (Fig. 1) that overlie bosses or other flange portions 28 on the laterally extending side portion 30 of the presser member 20. Through proper manipulation of the set screws 32, the plate 18 may be clamped firmly against the lower surface of the presser member 20 and a firm support obtained for the plate 18 and the brackets 22, 24 upon the flange or side portion 30 of the presser member 20. Preferably the front bracket 24 has an upstanding portion 33 to engage the front end of the presser member to position the support 16. Secured to an upstanding arm portion of the rear bracket 22 by a bolt 34 is an adjustable bracket 36 adapted to be secured in adjusted position by means of a second bolt 38 which passes through the bracket 22 and through an elongated slot 40 in the bracket 36. As shown, the upstanding arm of the front bracket 24 also carries an adjustable bracket 42 which is adjustably secured to bracket 24 by means preferably of two bolts 44 which pass through openings in bracket 24 and through elongated slots 46 in the bracket 42. Upon loosening all of the bolts 34, 38 and 44 of the two brackets 36, 42 which are rigidly connected to each other by a rod or tube 50 may be adjusted as one piece about the pivot point of the bolt 34, the direction of adjustment being up or down in a vertical plane for purposes which will be hereinafter explained, the adjusted position of the adjustable brackets being maintained by tightening the bolts already mentioned. As shown, the upper ends of the adjustable brackets 36, 42 are provided with curved seat portions 52 (Figs. 1 and 5) for the reception of a supporting member which may be the rod or tube 50. If a tube be used like that shown in the drawings the member 50 may be readily secured in place by means of screws 54 which are passed through openings in the seat portions 52 and corresponding openings in alinement in the tube 50 and threaded into semi-cylindrical blocks 56 (Fig. 1) whereby the member 50 is secured rigidly in place in a manner that will be readily understood. In the construction shown, the lower ends of the movable brackets 36, 42 are provided with laterally extending projections 60 upon which is secured a rack bar 62 so that upon adjustment of the movable brackets 36, 42, the rack bar 62 is also adjusted and maintains its parallel relation to the member 50. The bracket 16 with its supporting bars 50 and 62 for the resurfacing machine provides a structure which is light in weight without sacrifice of the necessary strength and rigidity. As will hereinafter be made more clear as the description proceeds, the member 50 and the rack bar 62 not only furnish supporting surfaces for the resurfacing device but also co-operate with other parts to assist in adjustment of the resurfacing device in directions longitudinal of the presser member of the clicking machine.

As before stated the resurfacing machine comprises the supporting frame 14, and this frame, in the construction shown, is provided with an arm or arms 70 (Figs. 1 and 2) which end in a plate 72 to which is secured a second plate 74 by means of bolts 76, 77. (Figs. 2 and 3) plate 74 being provided with an arm or arms 78 having concaved seat portions 80 (Fig. 1) for engagement over the outside cylindrical surface of the tubular member 50. This arrangement, as will be readily understood, furnishes means for facilitating the assembly of the frame 14 of the resurfacing machine with the bracket 16. At the same time it facilitates sliding of the machine longitudinally of the bracket on the supporting member 50. Rigid with the frame 14 is a flanged projection 86 (Figs. 1 and 3) provided with a slot adapted to receive a plate or gib 88 from which projects a set screw 90 through a slot 92 in the projection 86, the arrangement being such that the plate 88 may be adjustably secured in the slot in the projection 86, the purpose of the plate or gib 88 being to present a smooth vertical surface for contact with a corresponding surface on one side of the rack bar 62 during sliding adjustment of the resurfacing machine along the bracket, and for another purpose as will presently be described. Since the frame 14 is supported pivotally on the tubular member 50 the weight of the frame 14 and the parts carried thereby will keep the vertical surfaces on the plate 88 and on the rack bar 62 in contact with each other so that these surfaces act as supports for the frame 14 while at the same time permitting a sliding contact during adjustment of the resurfacing device longitudinally of the presser member 20. Preferably, and as shown, the bolts 76 pass through elongated slots 93 (Fig. 3) in the plate 72 so that upon loosening these bolts the frame 14 may be adjusted about the bolt 77 (Fig. 2) in the pivotal opening 95 (Fig. 3) in order to bring the lower surface of the cutter head 10 into the desired plane extending from front to rear of the cutting block to be resurfaced. The means provided for securing the desired adjustment of the frame 14 comprises, in the construction shown, an arm 96 (Figs. 1 and 3) extending upwardly from the plate 72 and provided with a screw threaded opening to receive a set screw 98 which contacts with the upper surface of the plate 74. With the bolts 76 loosened, the frame may be properly adjusted by manipulation of the set screw 98 whereby the frame is caused to swing about the bolt 77 as a center, and in a plane parallel with the upstanding parts of the bracket 16. Thereafter all of the bolts 76, 77 are tightened to hold the frame in adjusted position. For adjusting the frame 14 about the axis of the supporting member 50 there is utilized the plate or gib 88 which is wedge shaped so that adjustment of the frame 14 may be readily secured by tapping with a hammer on one end thereof until the lower end of the cutter head 10 is in the desired plane extending transversely of the block surface, the purpose being to adjust the frame 14 in a direction toward or from the bracket 16 and in a plane at a right angle to that of the adjustment secured by the set screw 98.

Means is preferably provided for moving the resurfacing device along its support from front to rear of the presser arm 20 so that the cutting block 110 below the presser member 20 may be resurfaced throughout its entire extent if it should be desirable to do so. In the construction shown this means comprises a shaft 112 having a bearing in the frame 14 and provided at one end with a hand wheel 114 having a handle 116. At its other end the shaft 112 carries a pinion indicated by dotted lines 118 (Fig. 1) for meshing engagement with a rack 120 (Figs. 1 and 5) on the upper surface of the bar 62. It will be readily understood that upon rotating the shaft 112 the pinion 118 will travel along the rack 120 thus causing movement of the resurfacing device in the desired direction either toward the front or toward the rear of the machine. The extent of the adjustment at any given time would correspond very closely to the width of the part resurfaced at any one operation caused by operating the resurfacing device at the same time that the presser member 20 is swung from one side of the block to the other. In other words, after resurfacing along a path from one side of the block to the other, the resurfacing device would be set back one step, a distance corresponding closely to the width just resurfaced, and then the presser member would be swung once more from side to side of the cutting block while the cutters are rotating, and this operation repeated until all of the block is resurfaced. After adjusting the resurfacing device by means of the hand wheel 114, the device is preferably locked in adjusted position through proper manipulation of a handle 124. This handle is screw threaded upon the end of a rod 126 mounted in the frame 14 and having at its other end a clamp member 128, the said clamp member carrying a stud 139 for sliding movement in a socket 132 in a part of the frame 14 so that the clamp member may move from and into clamping position without any tendency to rotate or bind upon the clamp surface. It will be understood that when the hand wheel 124 is turned in the direction to draw upon the rod 126, the clamp 128 is caused to engage firmly with the inclined surface 134 upon the rack bars 62, the interconnection between the clamp bar 128 and the plate 88 being such as to hold the resurfacing device fixedly in adjusted position. In order to adjust the resurfacing device it is, of course, first necessary to release the clamp through proper manipulation of the hand wheel 124.

As heretofore stated, the resurfacing device comprises the cutter head 10 which, in the illustrative construction, is fixedly secured to the lower end of a shaft 140 (Fig. 3) journaled in bearings in the frame 14 and supported preferably by means of anti-friction devices indicated at 142, 144. Secured to the shaft 140 adjacent to the upper end thereof is a gear wheel 146 having a relatively wide toothed surface adapted for engagement selectively with a plurality of gears for purposes which will be hereinafter described. In the preferred construction, the cutter shaft 140 is driven by means of the electric motor 12 which has its shaft connected to a shaft 150 by means of two circular plates 152, 154, (Fig. 1) the former being rigidly connected to the shaft 150 while the plate 154 is rigidly connected to the motor shaft, the plates 152, 154 being connected by pins 156 which pass through openings 158 (Fig. 2) in the two plates 152, 154. Secured by a key to the shaft 150 is a small pinion 160 arranged to be constantly in mesh with a gear 162. Also keyed or otherwise secured to the shaft 150 is a gear or relatively large pinion 164 arranged to be constantly in mesh with a gear 166. Since the gears 162 and 166 are mounted on stub shaft 168, 170, respectively, carried by the arms 172, 174 of a spider 176 which has a handle 178 and which is pivotally mounted about the center of the shaft 150, it follows that the gear wheels 162 and 166 may be brought alternately into mesh with the gear wheel 146 which is on the cutter shaft 140. It will be understood that by this means the cutter shaft may be selectively driven at different speeds. When the gear wheel 162 is in mesh with the gear 146 the cutter shaft is driven at the rate of 1500 R. P. M., this being the desirable speed when the cutters are operating on a cutting block composed of fibre of a special composition, such as cutting blocks known in the trade as long-life fibre blocks. On the other hand, when the gear wheel 166 is in mesh with a gear 146 on the cutter shaft 140 the speed of the cutter shaft is raised to about 3600 R. P. M. and in this case the cutters are rotated at a speed suitable for resurfacing wooden blocks made of a very fine grade of hard maple. As a matter of convenience there is provided a pin 180 mounted in a stationary part of the frame 14 and adapted to be inserted in either one of the two holes 182 (Fig. 2) in a part of the handle 178, there being preferably three holes with which the pin may be engaged to hold the desired gears in mesh, comprising an intermediate hole 184 for holding the spider and the gears in neutral position in which the cutter is not being driven. This provision of a neutral position for the spider may have a number of advantages. For instance, the operator may place the spider in neutral position upon leaving his machine, thus making it impossible for an outsider, or one who does not understand the machine, to operate the latter and possibly cause damage to the cutting block or to the machine while its rightful operator is absent. Moreover, it is possible in this way to throw out the cutting tools without interfering with the blower or dust removing device which will now be described.

In the construction shown, the dust removing device comprises a fan 190, having a plurality of blades 192, preferably eight, fixedly secured thereto, and mounted for rotation in a chamber 194, an extension of the chamber being furnished by cover members 196, 198 which surround the cutter head 10. At one side the chamber 194 is enlarged as at 200 (Figs. 2 and 3) to merge into a conduit 202 which leads into the dust and chip container 204. Preferably, and as shown, the container 204 is secured in place by a tube portion 206 which telescopes upon the end of the conduit 202 (Fig. 2) and by a forked arm 208 which is adapted to embrace the end of a bracket 210 extending out from the frame 14, a pin 212 serving to retain the forked arm and the bracket in fixed engagement with each other. Upon removing the pin 212 the container 204 may be readily removed to empty it of dust and chips. When a wooden block is being resurfaced a wire net of rather fine mesh is used on the top of the container 204, while a coarser net is used when the resurfacing device is employed in operations upon fibre blocks of the kind specified in the foregoing discussion, the reason being that in resurfacing the wooden block there is a great deal of fine dust produced which is not the case in operating on the fibre block. In order that the chips or other particles may not adhere to the blades 192 there is provided a clearer or chip remover 214 secured to the outside of the cover portion 196 so that it may be readily removed or secured in place without the necessity of entering the chamber 194.

While a number of different forms of cutters have heretofore been employed with more or less success in resurfacing devices of the type disclosed in this application, it has been demonstrated that the illustrative cutter as constructed and mounted possesses marked advantages over anything heretofore employed in the industry. Each cutter 220 is preferably made of a bar of stellite, a special form of hardened steel especially suited to the making of a tool which is subjected to the wear involved in cutting operations at high speed on wooden and fibre blocks. Each cutter 220 is preferably rectangular in cross section and is mounted at an angle to the lower end of the cutter head and also in angular relationship to the clamping bars 222, 224 which retain the cutter in place, the angular relationship being secured by positioning the cutter angled on its own axis as indicated in Fig. 4, the purpose of the last-mentioned angular relationship being to furnish, on the lower end of the cutter, a cutting edge having one end in advance of the other so that it operates to make a shearing cut. As shown, the upper clamp member 222 is secured to the lower clamp member 224 by means of a screw 226 which may be removed or loosened to permit of the removal of the cutter 220 so that it may be sharpened as necessity arises, and then readily returned to its proper position which is determined by the seats formed in the opposing surfaces of the clamp members 222, 224. These blades are preferably four in number and they may be readily reached for removal or for adjustment upon displacement of the cover member 198.

With certain classes of clicking machines it is desirable to resurface the cutting block so that its upper surface slants downwardly from front to rear. Hence the brackets 36, 42, together with their rigidly connected parts 50 and 62, may be adjusted about the pivot 34 so that the front ends of the parts 50 and 62 which support the resurfacing machine, may be adjusted to a higher point than the rear ends thereof. Thus as the resurfacing machine is adjusted rearwardly from the front of the cutting block it moves downwardly and cuts progressively deeper into the block. It will be understood that the difference of level is not great and that the machine may be operated in a manner to accomplish the desired result without danger to the cutters.

In attaching the resurfacing apparatus to the presser member of a clicking machine the bracket 16 is first placed in position on the presser member, the upstanding bracket parts 22, 24 and 33 serving as positioning means, after which the securing screws 32 are manipulated to fix the bracket in place. Subsequently, the resurfacing machine is assembled with the bracket 16 by hooking the curved arm portion 78 over the tube 50 near the outer end thereof and permitting the frame 14 to contact through gravity with the front vertical face of the rack bar 62, whereupon the machine is shoved rearwardly into position for the first resurfacing operation along the front edge of the cutting block. It will be understood that during the operation of assembling the machine with the bracket, the locking member 128 is loosened and spaced as widely as possible from the plate or gib 88 so as to offer no obstruction to sliding the machine along the rack bar 62. After the machine has reached the desired position the locking member 128 is tightened through proper manipulation of the handle 124 and the machine is then in condition for operation.

Preparatory to operating the machine to resurface a block the presser member is swung initially to one side or the other of the cutting block and the resurfacing machine is moved to the desired location on the presser member and secured there by the locking means. The presser member is then raised or lowered until the cutters extend below the block surface a distance corresponding to the depth of the cut to be made. The cutters are started in rotation by closing the motor circuit and then while the cutters are rotating the presser member is moved at a moderate, uniform rate from right to left or from left to right over the cutting block, cutting a curved path on an arc the center of which is the post or spindle which supports the presser member. After one path has been cut across the block, the locking member 128 is released and the resurfacing machine adjusted on the presser member a distance corresponding closely to the width of the portion just resurfaced. The locking member 128 is then again tightened and another path cut across the block and these operations repeated until all the portions of the blocks have been resurfaced, as desired.

Having thus described the invention, what is claimed as new and desired to be secured by Letters Patent of the United States is:—

1. In an apparatus for resurfacing blocks, a bracket adapted for attachment to a support above a block, said bracket being provided with spaced supporting surfaces extending longitudinally of the bracket, a resurfacing machine having a frame provided with surfaces for engaging the spaced supporting surfaces on the bracket for sliding movement longitudinally of the latter, and means for securing the resurfacing machine in selected position during a resurfacing operation on any desired portion of the block.

2. In an apparatus of the character described, a bracket adapted to be secured to a support above a block, said bracket being provided with spaced bars extending longitudinally thereof, and a resurfacing machine having a frame provided with an arm having an end portion constructed to hook over the upper bar, and provided with another portion to rest in contact upon the lower bar by gravity, whereby assembly of the resurfacing machine with the bracket is facilitated.

3. In an apparatus of the character described, a bracket adapted to be attached to a support above a block to be resurfaced, said bracket having a semi-cylindrical surface extending longitudinally of its upper portion, a rack bar extending longitudinally of the bracket in parallel relation to the semi-cylindrical surface, a resurfacing machine having a frame provided with an arm having a curved end portion to fit the semi-cylindrical surface on the bracket, a shaft mounted in the frame, a pinion on the shaft mounted for engagement with the rack bar, and means for rotating the shaft to cause movement of the resurfacing machine longitudinally of the bracket.

4. In an apparatus of the character described, a bracket adapted for attachment to a support above a block to be resurfaced, said bracket being provided with spaced supporting surfaces extending longitudinally thereof, a resurfacing machine having a frame provided with surfaces to contact with the supporting surfaces on the bracket for movement longitudinally thereof, said resurfacing machine having a cutter head provided with a cutter for operating on the block, and means for adjusting the resurfacing machine on the bracket in two planes at right angles to each other so as to position the cutter properly with respect to the block to be operated upon.

5. In an apparatus of the character described, a support having parallel supporting surfaces extending longitudinally thereof, a resurfacing machine having a frame provided with surfaces to engage the supporting surfaces on the support for sliding movement longitudinally thereof, means engaging with one of the supporting surfaces on the support for moving the resurfacing machine longitudinally thereof, and means for fixing the resurfacing machine in selected position longitudinally of its support.

6. In an apparatus of the character described, a support having a bar extending longitudinally thereof with a smooth supporting surface, a rack bar on the support in parallel relation to and spaced from the supporting bar, a resurfacing machine having a frame provided with an arm having a smooth surface adapted to engage the smooth surface of the supporting bar, a shaft mounted in the frame, a pinion on the shaft for engaging with the rack bar, means for rotating the shaft and thereby causing the resurfacing machine to move along its support, and a locking means for holding the resurfacing machine in selected position with respect to the support.

7. In an apparatus of the character described, a support having a rack bar extending longitudinally thereof, the rack bar having also smooth surfaces extending parallel with the rack on the bar, a resurfacing machine having a frame provided with a supporting surface to engage on the support, a shaft mounted in the frame, a pinion mounted on the shaft for engagement with the rack of the rack bar, said frame having further a smooth surface for engaging slidably with one of the smooth surfaces on the rack bar, and a locking means for engaging with the other smooth surface on the rack bar in opposed relation to the first mentioned smooth surface whereby upon tightening the locking means the rack bar is gripped to hold the resurfacing machine in selected position for a resurfacing operation.

8. In an apparatus of the character described, a support having supporting surfaces extending longitudinally thereof, a resurfacing machine having a frame provided with surfaces to engage said supporting surfaces in slidable relation thereto, a shaft mounted in the frame, a pinion on the shaft, a rack bar on the support for engagement with the pinion whereby upon rotation of the pinion the resurfacing device is moved longitudinally of the support, a second shaft in the frame, a lock at one end of the shaft for engagement frictionally with a side surface on the rack bar, and manually operable means mounted on the shaft for causing the lock to engage firmly with the rack bar for holding the resurfacing machine in selected position during the resurfacing operation.

9. In a resurfacing machine, a shaft, a cutter head mounted on the shaft, a motor driven shaft, a fan connected to one end of the motor driven shaft so that the fan is driven at the motor speed, and a plurality of selectively operable means for connecting the motor driven shaft to the cutter head shaft so that the latter may be driven at different speeds.

10. In a resurfacing machine, a shaft, a motor directly connected thereto to drive the shaft, a fan secured to the other end of the shaft, said fan comprising a plurality of blades operative to blow the dust and chips along a passageway in the frame of the machine, and a clearer or chip remover positioned centrally of the blades for removing chips or dust from the blades.

11. In an apparatus for resurfacing blocks, a resurfacing machine having a cutter, in combination with a support designed to support the machine while it is operating on a block, said support comprising a plate adapted to be attached to the presser member of a clicking machine, and a member comprising spaced supporting surfaces for the direct support of the resurfacing machine, said member being pivotally connected at one end to the plate, adjusting means being provided for securing the member at any desired angle with respect to the plate, whereby the resurfacing machine is supported for movement from one side to the other of the cutting block and in such manner that it moves downwardly as it is adjusted rearwardly from the front of the block.

12. In an apparatus of the character described, a support for a resurfacing machine comprising a plate adapted to be connected to the presser member of a clicking machine, said plate having brackets extending upwardly therefrom at its front and rear ends, respectively, spaced supporting bars adapted to take the weight and to guide the resurfacing machine during adjustment thereof, plates connecting the bars at their opposite ends, and means for securing the plates to the first mentioned plate in adjustable relation thereto so that the supporting bars may be secured in inclined position with respect to the plate while being maintained in their parallel relation to each other.

13. In a resurfacing machine, a shaft, a cutter head mounted on the shaft, a motor driven shaft, a fan connected to one end of the motor driven shaft so that the fan is driven at a constant speed, a plurality of means for connecting the motor driven shaft selectively to the cutter head shaft so that the latter may be driven at different speeds, and means for holding the connecting means in inoperative position so that only the fan will be operated upon turning on the power.

In testimony whereof I have signed my name to this specification.

ANNE W. MEYER,
*Administratrix of the Estate of William C. Meyer, deceased.*